United States Patent
Sugawara et al.

(10) Patent No.: US 11,036,203 B2
(45) Date of Patent: Jun. 15, 2021

(54) FABRICATION SYSTEM, FABRICATION ESTIMATION SYSTEM, INFORMATION PROCESSING APPARATUS, FABRICATING APPARATUS, FABRICATING METHOD, AND RECORDING MEDIUM

(71) Applicants: Wataru Sugawara, Saitama (JP); Hiroshi Maeda, Kanagawa (JP); Yoshinobu Takeyama, Kanagawa (JP); Tsukasa Matsuoka, Kanagawa (JP); Yoichi Ito, Tokyo (JP); Shingo Nagatsuka, Kanagawa (JP)

(72) Inventors: Wataru Sugawara, Saitama (JP); Hiroshi Maeda, Kanagawa (JP); Yoshinobu Takeyama, Kanagawa (JP); Tsukasa Matsuoka, Kanagawa (JP); Yoichi Ito, Tokyo (JP); Shingo Nagatsuka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 77 days.

(21) Appl. No.: 16/352,026

(22) Filed: Mar. 13, 2019

(65) Prior Publication Data
US 2019/0286104 A1    Sep. 19, 2019

(30) Foreign Application Priority Data

Mar. 16, 2018 (JP) .............................. JP2018-048917
Mar. 28, 2018 (JP) .............................. JP2018-061779
(Continued)

(51) Int. Cl.
*G05B 19/4099* (2006.01)
*B33Y 50/02* (2015.01)
(Continued)

(52) U.S. Cl.
CPC ........ *G05B 19/4099* (2013.01); *B29C 64/393* (2017.08); *B33Y 50/02* (2014.12);
(Continued)

(58) Field of Classification Search
CPC ...... G05B 19/4099; G05B 2219/49023; G06F 30/20; G06F 2113/10; B33Y 50/02; G01B 11/24; B29C 64/393
See application file for complete search history.

(56) References Cited

U.S. PATENT DOCUMENTS 10,112,262 B2 * 10/2018 Cheverton ................ G01J 5/06
10,252,335 B2 *  4/2019 Buller ................... B23K 26/034
(Continued)

FOREIGN PATENT DOCUMENTS

JP    2016-137653    8/2016
JP    2016-137654    8/2016
(Continued)

OTHER PUBLICATIONS

Partial European Search Report dated Aug. 19, 2019 issued in corresponding European Application No. 19162038.4.

*Primary Examiner* — Thomas C Lee
*Assistant Examiner* — Charles Cai
(74) *Attorney, Agent, or Firm* — Harness, Dickey & Pierce, P.L.C.

(57) ABSTRACT

A fabrication system for fabricating a three-dimensional object includes processing circuitry. The processing circuitry estimates, according to a fabrication condition and fabrication data, a three-dimensional object to be fabricated according to the fabrication data and corrects the fabrication data according to an estimation result of the three-dimensional object estimated by the processing circuitry.

15 Claims, 16 Drawing Sheets

(30) Foreign Application Priority Data

Jun. 22, 2018 (JP) .............................. JP2018-119099
Jan. 23, 2019 (JP) .............................. JP2019-009602

(51) Int. Cl.
*G01B 11/24* (2006.01)
*B29C 64/393* (2017.01)
*G06F 30/20* (2020.01)

(52) U.S. Cl.
CPC .............. *G01B 11/24* (2013.01); *G06F 30/20* (2020.01); *G05B 2219/49023* (2013.01)

(56) References Cited

U.S. PATENT DOCUMENTS

| | | | |
|---|---|---|---|
| 10,421,238 B2 * | 9/2019 | Leonard | G06F 30/00 |
| 2002/0104973 A1 | 8/2002 | Kerekes | |
| 2007/0238204 A1 * | 10/2007 | Kurihara | H01L 22/20 |
| | | | 438/14 |
| 2015/0045928 A1 * | 2/2015 | Perez | B29C 48/02 |
| | | | 700/110 |
| 2015/0174828 A1 | 6/2015 | Creuzer et al. | |
| 2015/0198943 A1 | 7/2015 | Kotlus | |
| 2015/0210011 A1 | 7/2015 | Conrow et al. | |
| 2015/0331402 A1 | 11/2015 | Lin et al. | |
| 2016/0114431 A1 * | 4/2016 | Cheverton | G01J 5/004 |
| | | | 219/76.1 |
| 2016/0136896 A1 | 5/2016 | Wighton | |
| 2016/0185044 A1 * | 6/2016 | Leonard | G05B 15/02 |
| | | | 700/98 |
| 2016/0236416 A1 | 8/2016 | Bheda et al. | |
| 2017/0050374 A1 | 2/2017 | Minardi et al. | |
| 2017/0056970 A1 * | 3/2017 | Chin | B33Y 70/00 |
| 2017/0057170 A1 | 3/2017 | Gupta et al. | |
| 2018/0093418 A1 * | 4/2018 | Lappas | B29C 64/10 |
| 2018/0095450 A1 * | 4/2018 | Lappas | B33Y 30/00 |
| 2019/0143412 A1 * | 5/2019 | Buller | B33Y 30/00 |
| | | | 219/76.12 |

FOREIGN PATENT DOCUMENTS

| | | |
|---|---|---|
| JP | 2016-168692 | 9/2016 |
| JP | 2017-087458 | 5/2017 |
| JP | 2017-109320 | 6/2017 |
| JP | 2017-202601 | 11/2017 |
| JP | 2018-008403 | 1/2018 |
| WO | WO-2015/020939 A1 | 2/2015 |
| WO | WO2015/081009 A1 | 6/2015 |
| WO | WO2016/151784 A1 | 9/2016 |

* cited by examiner

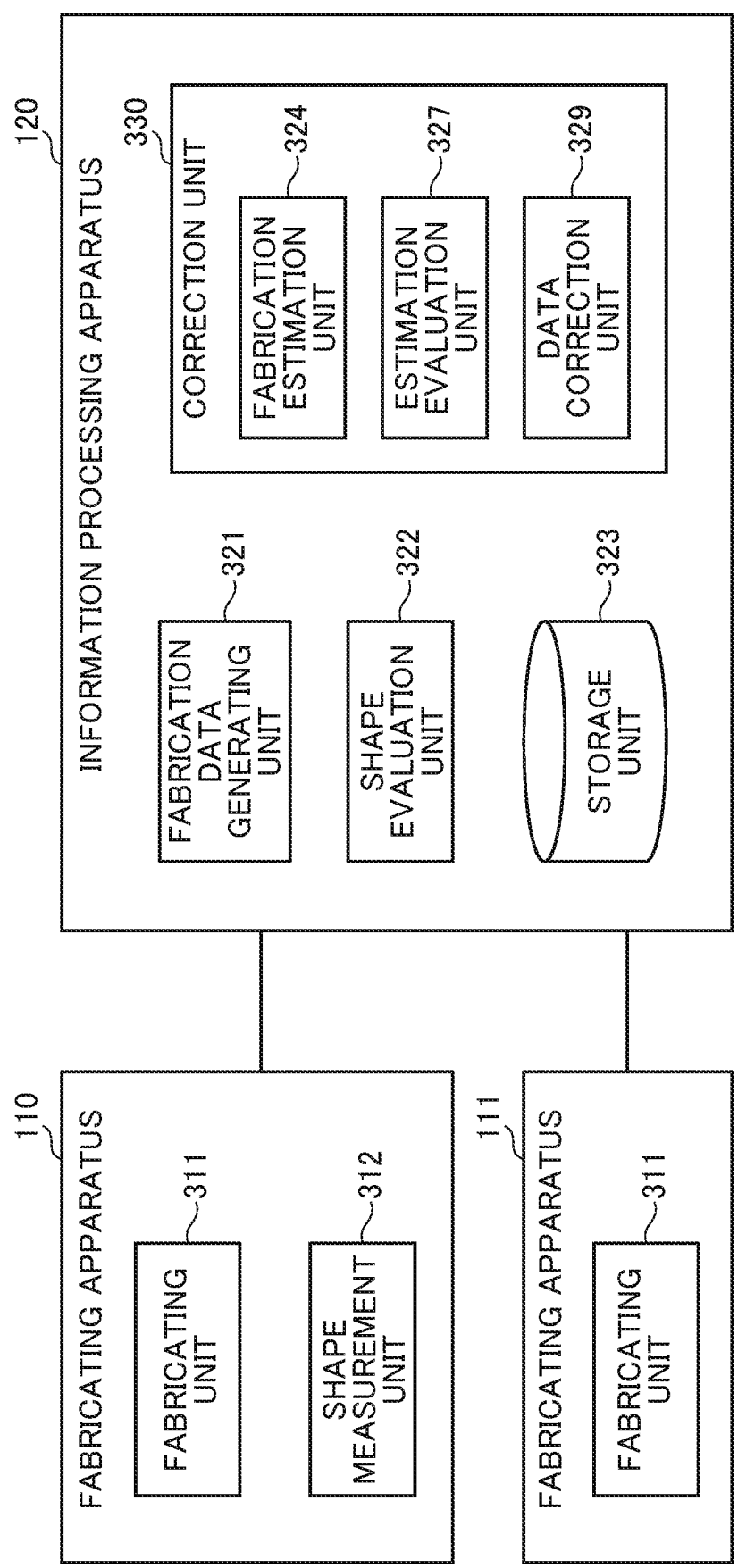

FABRICATION OBJECT MODEL DATA → FABRICATE UNDER CONDITION A → SHAPE OF FABRICATED THREE-DIMENSIONAL OBJECT

ESTIMATION OBJECT MODEL DATA → ESTIMATE UNDER CONDITION B → SHAPE OF ESTIMATED THREE-DIMENSIONAL OBJECT

FABRICATION SYSTEM, FABRICATION ESTIMATION SYSTEM, INFORMATION PROCESSING APPARATUS, FABRICATING APPARATUS, FABRICATING METHOD, AND RECORDING MEDIUM

CROSS-REFERENCE TO RELATED APPLICATIONS

This patent application is based on and claims priority pursuant to 35 U.S.C. § 119(a) to Japanese Patent Application Nos. 2018-048917, filed on Mar. 16, 2018, 2018-061779, filed on Mar. 28, 2018, 2018-119099, filed on Jun. 22, 2018, and 2019-009602, filed on Jan. 23, 2019 in the Japan Patent Office, the entire disclosure of each of which is hereby incorporated by reference herein.

BACKGROUND

Technical Field

Aspects of the present disclosure relate to a fabrication system, a fabrication estimation system, an information processing apparatus, and a fabricating apparatus, a fabricating method, and a recording medium.

Related Art

A fabricating apparatus for creating a three-dimensional object according to input three-dimensional shape data (model data) has been developed.

In the three-dimensional fabrication, there is a case where a three-dimensional object is fabricated as having a difference between a desired shape, that is, the model data and a three-dimensional object which has been actually fabricated.

SUMMARY

In an aspect of the present disclosure, there is provided a fabrication system for fabricating a three-dimensional object includes processing circuitry. The processing circuitry estimates, according to a fabrication condition and fabrication data, a three-dimensional object to be fabricated according to the fabrication data and corrects the fabrication data according to an estimation result of the three-dimensional object estimated by the processing circuitry.

In another aspect of the present disclosure, there is provided an information processing apparatus for controlling a fabricating apparatus that fabricates a three-dimensional object. The information processing apparatus includes processing circuitry to estimate, according to a fabrication condition and fabrication data, a three-dimensional object to be fabricated according to the fabrication data and correct the fabrication data according to an estimation result of the three-dimensional object estimated by the processing circuitry.

In still another aspect of the present disclosure, there is provided a fabrication estimation system for estimating a shape of a three-dimensional object to be fabricated by a fabricating apparatus. The system includes processing circuitry to estimate a three-dimensional shape of a three-dimensional object to be fabricated according to composite data including body model data and additional model data; divide the three-dimensional shape of the three-dimensional object into a first partial shape corresponding to the body model data and a second partial shape corresponding to the additional model data; and evaluate the first partial shape divided by the processing circuitry.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 3 is a block diagram of software included in the information processing apparatus according to the present embodiment;

Figure 1:
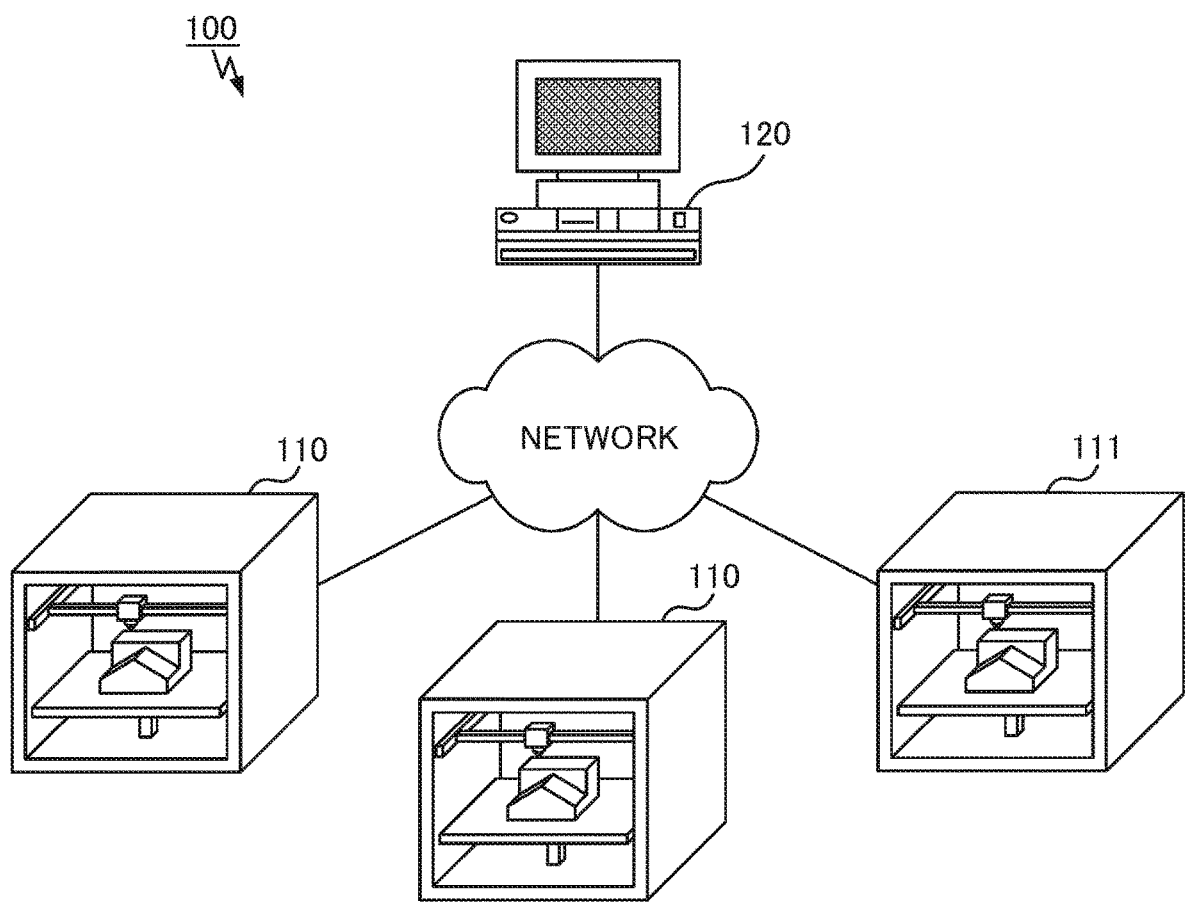
FIG. 1 is a diagram of a schematic configuration of hardware of an entire fabrication system according to an embodiment of the present disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity.

However, the disclosure of this specification is not intended to be limited to the specific terminology so selected and it is to be understood that each specific element includes all technical equivalents that have a similar function, operate in a similar manner, and achieve a similar result.

Hereinafter, the present disclosure will be described referring to embodiments. However, embodiments of the present disclosure are not limited to the embodiments described later. In the drawings to be referred below, common components are denoted with the same reference numeral, and description of the common component will be appropriately omitted.

FIG. 1 is a diagram of a schematic configuration of an entire fabrication system 100 according to an embodiment of the present disclosure. In FIG. 1, as an example, the fabrication system 100 is illustrated in which fabricating apparatuses 110 and 111 and an information processing apparatus 120 are connected via various networks such as the Internet and local area network (LAN). The number of fabricating apparatuses 110 and 111 and information processing apparatuses 120 are not limited to the number illustrated in FIG. 1, and the number of fabricating apparatuses 110 and 111 included in the fabrication system 100 are not limited. Furthermore, the fabricating apparatuses 110 and 111 and the information processing apparatus 120 may be directly coupled without being connected via the network. The fabricating apparatuses 110 and 111 may have a part of functions included in the information processing apparatus 120 and may include all the functions included in the information processing apparatus 120.

The fabricating apparatuses 110 and 111 are apparatuses for executing fabrication processing. For example, the fabricating apparatuses 110 and 111 receive fabrication data used to fabricate a desired three-dimensional object from the information processing apparatus 120 via the network and execute the fabrication processing.

Various fabrication methods have been proposed for three-dimensional fabrication, such as fused filament fabrication (FFF), selective laser sintering (SLS), material jetting (MJ), electron beam melting (EBM), and stereo lithography apparatus (SLA). Any fabrication method can be applied to the embodiment of the present disclosure. Furthermore, the fabrication method other than the method described above may be used.

Configurations of the fabricating apparatuses 110 and 111 vary depending on the fabrication method. For example, in a case of the FFF method, a heating mechanism for melting a fabrication material and a nozzle for discharging the fabrication material are included. In a case of the SLS method, a laser light source and the like are included.

The information processing apparatus 120 is a controller for controlling various processing executed by the fabricating apparatuses 110 and 111. Examples of the information processing apparatus 120 include a server device, a personal computer terminal, and the like. In addition, the information processing apparatus 120 can create model data as data indicating a shape of a three-dimensional object to be fabricated, can execute processing for converting a format of the model data into a format which can be processed by the fabricating apparatuses 110 and 111, and can set fabrication conditions of the fabricating apparatuses 110 and 111.

The fabrication conditions include, for example, a nozzle temperature, a lower surface temperature (build plate), an environmental temperature (air, in chamber), a nozzle moving speed, a material discharging speed, a tool path (how to draw trajectory of nozzle), a thickness of a laminated layer (height of single layer), and a material physical property (Young's modulus, Poisson's ratio, rigidity (modules of rigidity), linear expansion coefficient, density, specific heat, thermal conductivity, and the like). In addition, the fabrication condition may be a reheat condition when a laser is used, a cooling condition such as air blowing, and the like.

Next, hardware included in the fabrication system 100 will be described.

Figure 2A:
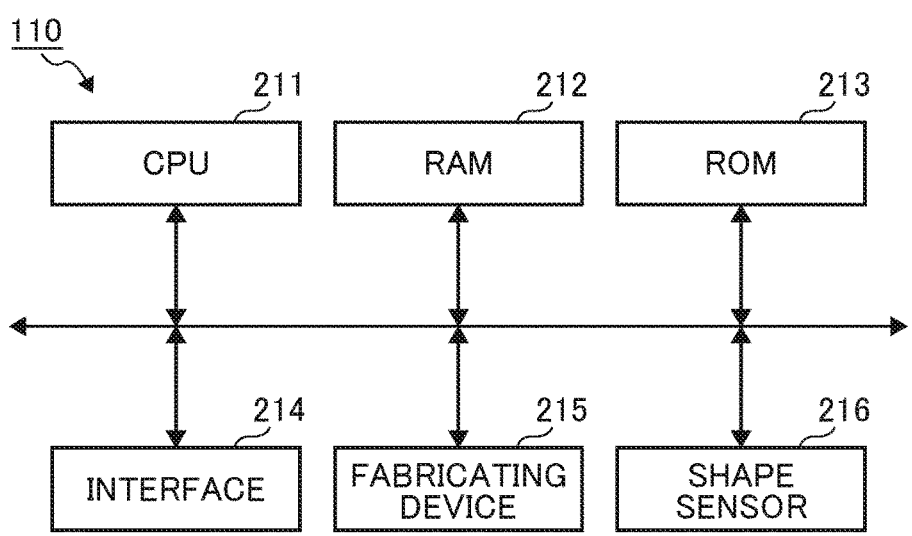
FIGS. 2A to 2C are diagrams of hardware configurations included in a fabricating apparatus and an information processing apparatus according to the present embodiment.
Figure 2B:
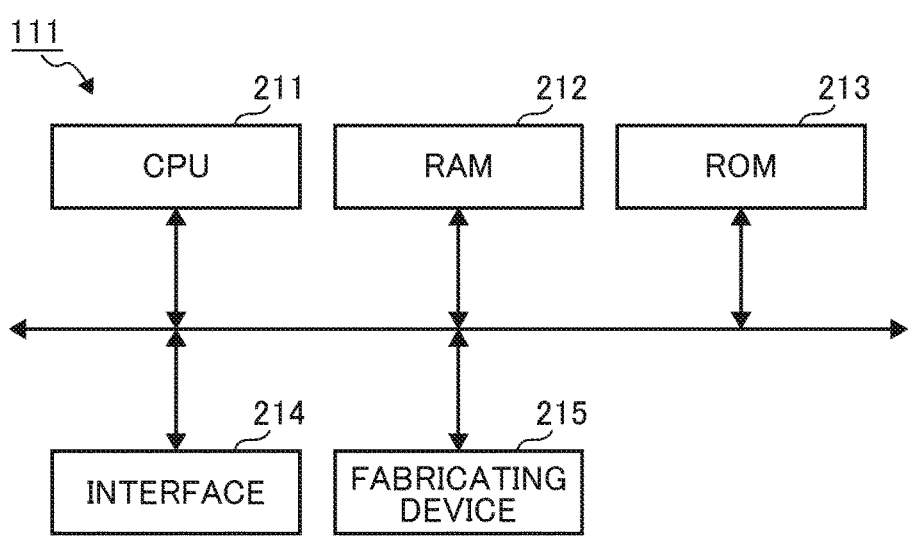
Figure 2C:
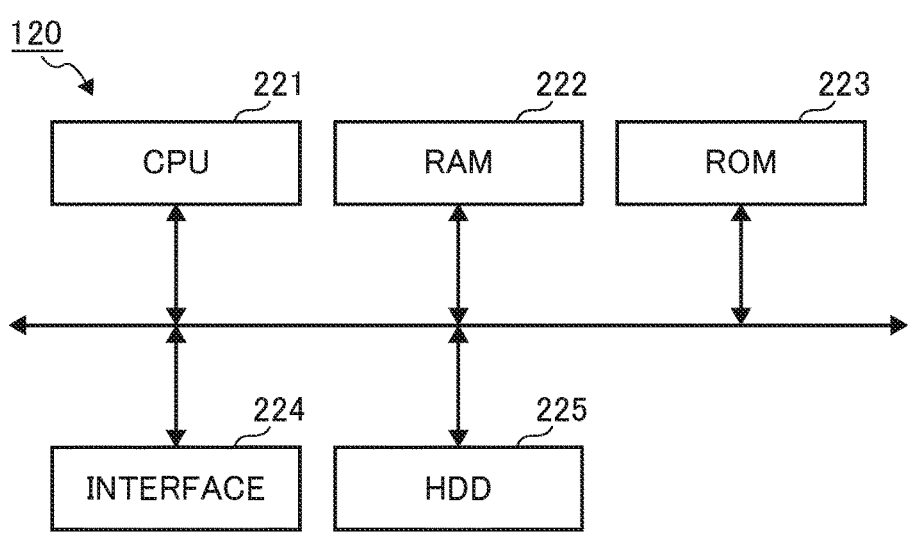

FIGS. 2A to 2C are diagrams of hardware configurations included in the fabricating apparatuses 110 and 111 and the information processing apparatus 120 according to the present embodiment. FIG. 2A illustrates a hardware configuration of the fabricating apparatus 110, FIG. 2B illustrates a hardware configuration of the fabricating apparatus 111, and FIG. 2C illustrates a hardware configuration of the information processing apparatus 120.

As illustrated in FIG. 2A, the fabricating apparatus 110 includes a central processing unit (CPU) 211, a random access memory (RAM) 212, a read only memory (ROM) 213, an interface 214, a fabricating device 215, and a shape sensor 216. Each of the hardware is coupled via a bus. The fabricating apparatus 110 may include a storage device corresponding to a hard disk drive (HDD) 225 described later.

The CPU 211 executes a program for controlling an operation of the fabricating apparatus 110 and executes predetermined processing. The RAM 212 is a volatile storage device for providing a space for executing the program executed by the CPU 211 and is used to store and develop programs and data. The ROM 213 is a nonvolatile storage device for storing a program executed by the CPU 211, firmware, and the like.

The interface 214 is a communication interface connected to, for example, the information processing apparatus 120, the network, and an external storage device. The fabricating apparatus 110 can transmit/receive various data such as control data of a fabrication operation, the model data of the three-dimensional object, and the set fabrication condition via the interface 214.

The fabricating device 215 is a device for fabricating the fabrication material into a desired shape to form a three-dimensional object. The fabricating device 215 includes a head, a stage, and the like and is configured according to the fabrication method.

The shape sensor 216 is a device for detecting the shape of the fabricated three-dimensional object and measures various dimensions such as an outer shape and a height of the three-dimensional object. Examples of the shape sensor 216 include an infrared sensor, a camera, a three-dimensional measurement sensor (for example, light cutting profile sensor) and the like. The fabricating apparatus does not necessarily include the shape sensor 216. For example, as the fabricating apparatus 111 illustrated in FIG. 2B, the configuration which does not include the shape sensor 216 may be used.

Next, the hardware configuration of the information processing apparatus 120 will be described.

As illustrated in FIG. 2C, the information processing apparatus 120 includes a CPU 221, a RAM 222, a ROM 223, an interface 224, and an HDD 225. Each of the hardware is coupled via a bus. Since the CPU 221, the RAM 222, the ROM 223, and the interface 224 correspond to the hardware of the fabricating apparatuses 110 and 111, description thereof will be omitted.

The HDD 225 is a readable/writable nonvolatile storage device which stores an operating system (OS) making the information processing apparatus 120 function, various applications, setting information, and various data. Furthermore, the HDD 225 may store data such as applications for controlling operations of the fabricating apparatuses 110 and 111, the model data, and the fabrication condition. The HDD 225 is an example of the storage device, and may be other storage device, and for example, may be a storage device such as a solid state drive (SSD).

Next, functional units executed by each of the hardware included in the fabrication system 100 according to the present embodiment will be described referring to FIG. 3. FIG. 3 is a block diagram of software included in the fabrication system 100 according to the present embodiment.

In the present embodiment, the fabricating apparatus 110 includes a fabricating unit 311 and a shape measurement unit 312, and the fabricating apparatus 111 includes a fabricating unit 311. Furthermore, the information processing apparatus 120 includes a fabrication data generating unit 321, a shape evaluation unit 322, a storage unit 323, and a correction unit 330.

First, the fabricating apparatus 110 will be described. The fabricating unit 311 is a unit for executing a fabrication operation according to the fabrication data. The fabricating unit 311 controls the fabricating device 215 to fabricate a three-dimensional object having a desired shape.

The shape measurement unit 312 is a unit for controlling the shape sensor 216 to measure the shape of the three-dimensional object fabricated by the fabricating unit 311. Measurement data of the shape measured by the shape measurement unit 312 is transferred to the information processing apparatus 120 via the interface 214. The fabricating apparatus 111 which does not include the shape sensor 216 has a configuration which does not include the shape measurement unit 312.

Next, the information processing apparatus 120 will be described.

The fabrication data generating unit 321 is a unit for generating the fabrication data as data obtained by converting the model data in a format which can be processed by the fabricating apparatuses 110 and 111. The fabrication data is generated from the model data and setting data of the fabrication condition, and, for example, is output in a format as slice data indicating a horizontally divided three-dimensional object. The model data may be created in the information processing apparatus 120, and the model data created by other device may be input to the information processing apparatus 120.

The shape evaluation unit 322 is a unit for calculating a difference between the shape of the fabricated three-dimensional object and the shape of the model data and evaluating the result of fabrication of the three-dimensional object. More particularly, the shape evaluation unit 322 compares the measurement data measured by the shape measurement unit 312 with the model data and evaluates fabrication result from the difference in shape. Data of evaluation of the fabrication result is stored in the storage unit 323.

The storage unit 323 is a unit for storing various data such as the model data, the fabrication data, the measurement data, and the setting data of the fabrication condition, and various evaluation results. Each functional unit writes/reads various data in/from the storage unit 323. Furthermore, the data stored in the storage unit 323 may be collected from the plurality of fabricating apparatuses 110 via the network. In a case where a plurality of times of fabrication is made by each fabricating apparatus 110, various data may be accumulated for each fabrication. Since the plurality of pieces of data is accumulated for each fabricating apparatus 110, accuracy of each unit in correction, estimation, and evaluation can be improved.

The correction unit 330 is a unit for estimating the shape of the three-dimensional object to be fabricated before the fabrication is performed and correcting the fabrication processing. The correction unit 330 includes a fabrication estimation unit 324, an estimation evaluation unit 327, and a data correction unit 329. As described later, the correction unit 330 in another embodiment may correct the fabrication processing without depending on the fabrication estimation unit 324 and the estimation evaluation unit 327.

The fabrication estimation unit 324 is a unit for estimating the shape of the three-dimensional object to be fabricated in a case of fabricating the model data under the set fabrication condition. The estimation result of the fabrication estimation unit 324 is output as estimation data. The fabrication estimation unit 324 may estimate the shape of the three-dimensional object according to the fabrication data obtained from the fabrication data generating unit 321. The estimation data estimated by the fabrication estimation unit 324 is stored in the storage unit 323.

The estimation evaluation unit 327 is a unit for comparing the estimation data with the model data and evaluating whether the fabrication succeeds from a difference between the shapes of both data. In a case where the difference between the shapes of the estimation data and the model data is smaller than a threshold, the estimation evaluation unit 327 determines that the fabrication has succeeded. Furthermore, in a case where the difference between the shapes of the estimation data and the model data is equal to or larger than the threshold, the estimation evaluation unit 327 determines that the fabrication fails. The evaluation result estimated by the estimation evaluation unit 327 is stored in the storage unit 323.

In a case where the estimation evaluation unit 327 has determined that the fabrication fails, the data correction unit 329 corrects the model data, the fabrication condition, and the like. The data correction unit 329 corrects the model data, the fabrication condition, and the like according to the fabrication result evaluation of the shape evaluation unit 322 accumulated in the storage unit 323. The data correction unit 329 may correct the model data, the fabrication condition, and the like without depending on the evaluation result of the estimation evaluation unit 327.

The fabrication estimation unit 324 may estimate the shape of the three-dimensional object to be fabricated again according to the corrected model data and fabrication condition.

The software blocks described above correspond to functional units implemented by the CPUs 211 and 221 executing programs of the second embodiment to function respective hardware. All the functional units indicated in the embodiment may be implemented as software, and a part or all of the functional units can be implemented as hardware providing equivalent functions. It is not necessarily for each functional unit described above to be included in the configuration illustrated in FIG. 3. In another preferred embodiment, each functional unit may be implemented by the fabricating apparatuses 110 and 111 and the information processing apparatus 120 in cooperation with each other.

Figure 4A:
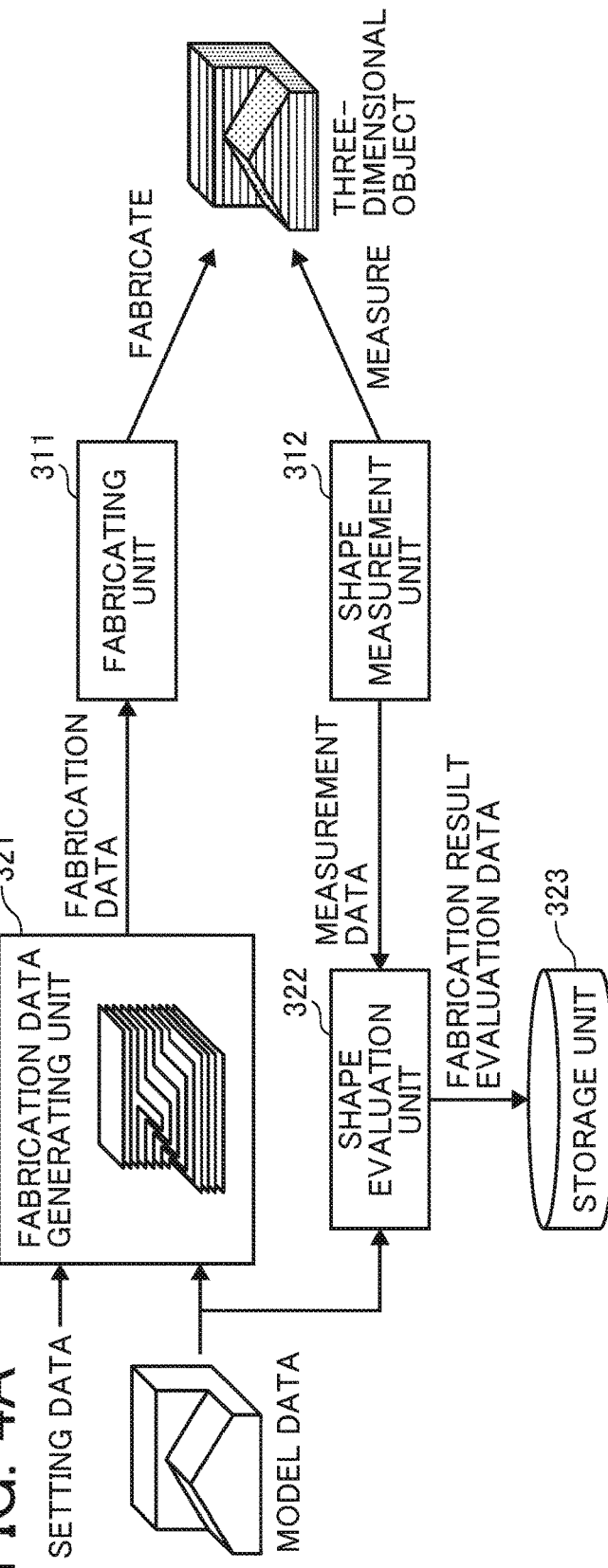
FIGS. 4A and 4B are diagrams of data flows of processing according to the present embodiment.
Figure 4B:
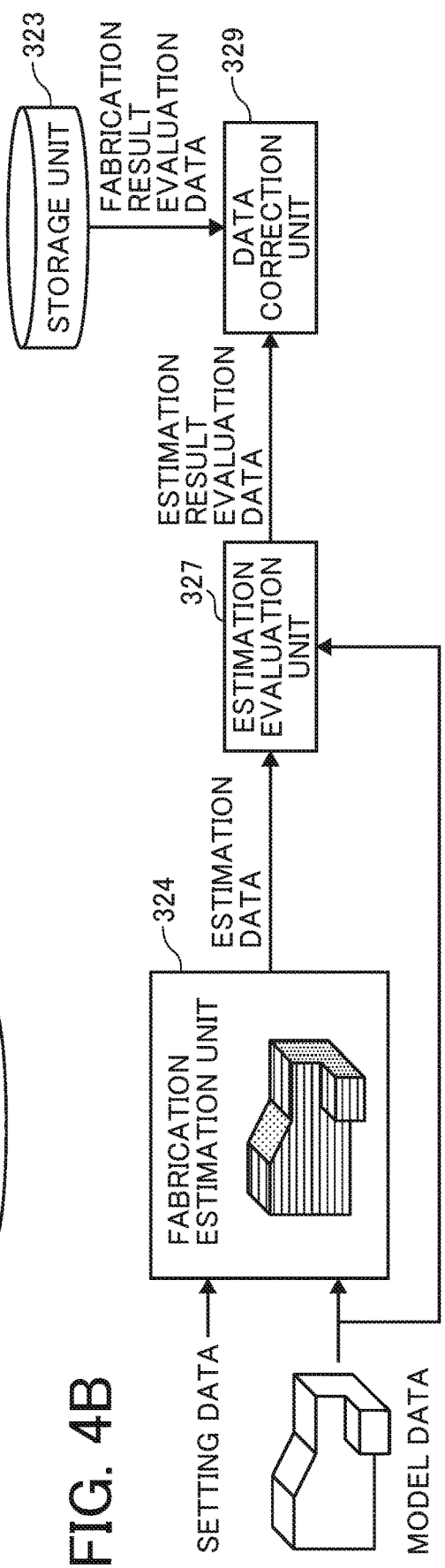

Next, a data flow of the present embodiment will be described. FIG. 4A is a data flow of processing for evaluating the shape of the three-dimensional object according to the present embodiment, and FIG. 4B is a data flow of correction processing according to the estimation result.

First, in FIG. 4A, the fabrication data generating unit 321 generates the fabrication data from the input model data according to the setting data of the fabrication condition. The fabricating unit 311 executes the fabrication processing according to the fabrication data and fabricates the three-dimensional object.

The shape measurement unit 312 measures the shape of the fabricated three-dimensional object and outputs the result as the measurement data. The shape evaluation unit 322 compares the measurement data with the model data which is the base of the fabrication data to evaluate the shape of the fabricated three-dimensional object. For example, a difference such as an external dimension, warpage of the shape, and the like is evaluated, and the difference is output as fabrication result evaluation data. The fabrication result evaluation data is stored in the storage unit 323.

By making the above evaluation for each time when the three-dimensional object is fabricated, the fabrication results according to various fabrication conditions and model data can be accumulated, and correction accuracy can be improved.

In FIG. 4B, the fabrication estimation unit 324 estimates the shape of the three-dimensional object which is fabricated in a case where the input model data is fabricated according to the setting data. The three-dimensional object may be estimated according to the fabrication data obtained from the fabrication data generating unit 321. The estimation evaluation unit 327 compares the estimation data with the model data to evaluate the estimated shape of the three-dimensional object. In the estimation, for example, the estimation evaluation unit 327 calculates the difference between the shapes of the estimation data and the model data and evaluates whether the fabrication succeed according to whether the difference is larger than the threshold.

The data correction unit 329 corrects the model data and the setting data so as to reduce the difference between the shapes of the estimation data and the model data according to estimation result evaluation data. Data may be corrected referring to the fabrication result evaluation data of the three-dimensional objects fabricated in the past accumulated in the storage unit 323, and this can improve the correction accuracy. Although the fabricating apparatus 111 does not include the shape measurement unit 312, the fabricating apparatus 111 may correct the data according to the fabrication result evaluation data of the shape evaluation unit 322 of the other fabricating apparatus 110 including the shape measurement unit 312.

Figure 5A:
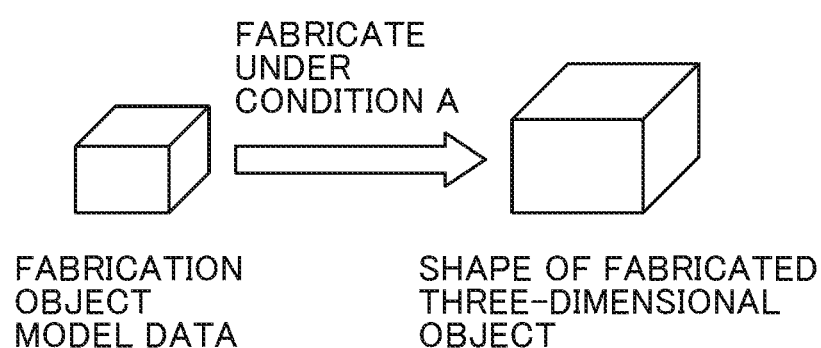
FIGS. 5A and 5B are diagrams of model data and shapes of three-dimensional objects fabricated or estimated based on the model data.
Figure 5B:
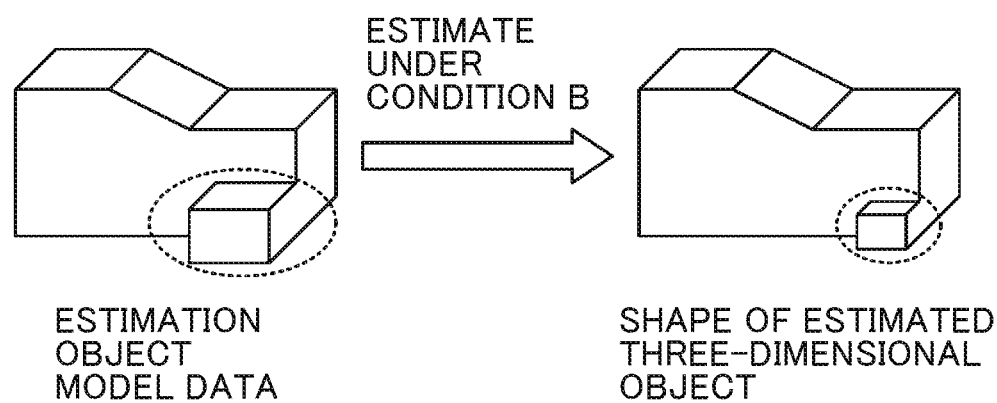

Here, data correction based on the fabrication result and the estimation result will be described. FIGS. 5A and 5B are diagrams of the model data and examples of the shapes of the three-dimensional object fabricated or estimated according to the model data. For example, it is assumed that the three-dimensional object fabricated in a case where fabrication target model data having a rectangular parallelepiped shape as illustrated in FIG. 5A is fabricated under a condition A be larger than the model data.

The shape evaluation unit 322 obtains a difference between the shape of the three-dimensional object and the shape of the model data and evaluates the fabrication result. Here, the difference may be evaluated as including not only the dimensions of the shape but also occurrence of warpage, a volume, and the like. Furthermore, in a case where the three-dimensional object has a characteristic shape, a local difference of the characteristic portion may be obtained. Then, the fabrication result evaluation data in which the difference, the model data, and the fabrication condition are associated with each other is calculated and is stored in the storage unit 323.

On the other hand, a case is considered where the shape of the three-dimensional object in a case where estimation target model data as in FIG. 5B is fabricated under a condition B is estimated. At this time, it is assumed that a portion having a rectangular parallelepiped shape of the estimated three-dimensional object in a region indicated by a broken line be smaller than the model data.

When the estimation evaluation unit 327 calculates the difference between the shape of the estimation target model data in FIG. 5B and the estimated shape of the three-dimensional object, the portion having a rectangular parallelepiped shape in the region indicated by the broken line is extracted as the difference. In a case where this difference is larger than the threshold, if the model data to be estimated is fabricated under the condition B, there is high possibility that the fabrication fails. Therefore, the data correction unit 329 corrects data.

The data correction unit 329 corrects the shape of the model data to reduce the difference. Since the portion having a rectangular parallelepiped shape becomes smaller in the estimation, the data correction unit 329 corrects the model data to increase the dimension of the portion having a rectangular parallelepiped shape to fabricate a three-dimensional object having a shape close to the original estimation target model data.

Furthermore, the data correction unit 329 may refer to the fabrication result evaluation data stored in the storage unit 323. For example, as described referring to FIG. 5A, the storage unit 323 stores information such that the dimension of the three-dimensional object fabricated in a case where the model data having a rectangular parallelepiped shape is fabricated under the condition A is larger than the model data. Therefore, the data correction unit 329 determines that the portion having a rectangular parallelepiped shape is fabricated to be larger when fabricating an object under the condition A, and corrects the setting data of the fabrication condition from B to A. With this correction, a three-dimensional object having a shape close to the original estimation target model data can be fabricated at the time of actual fabrication.

Figure 6:
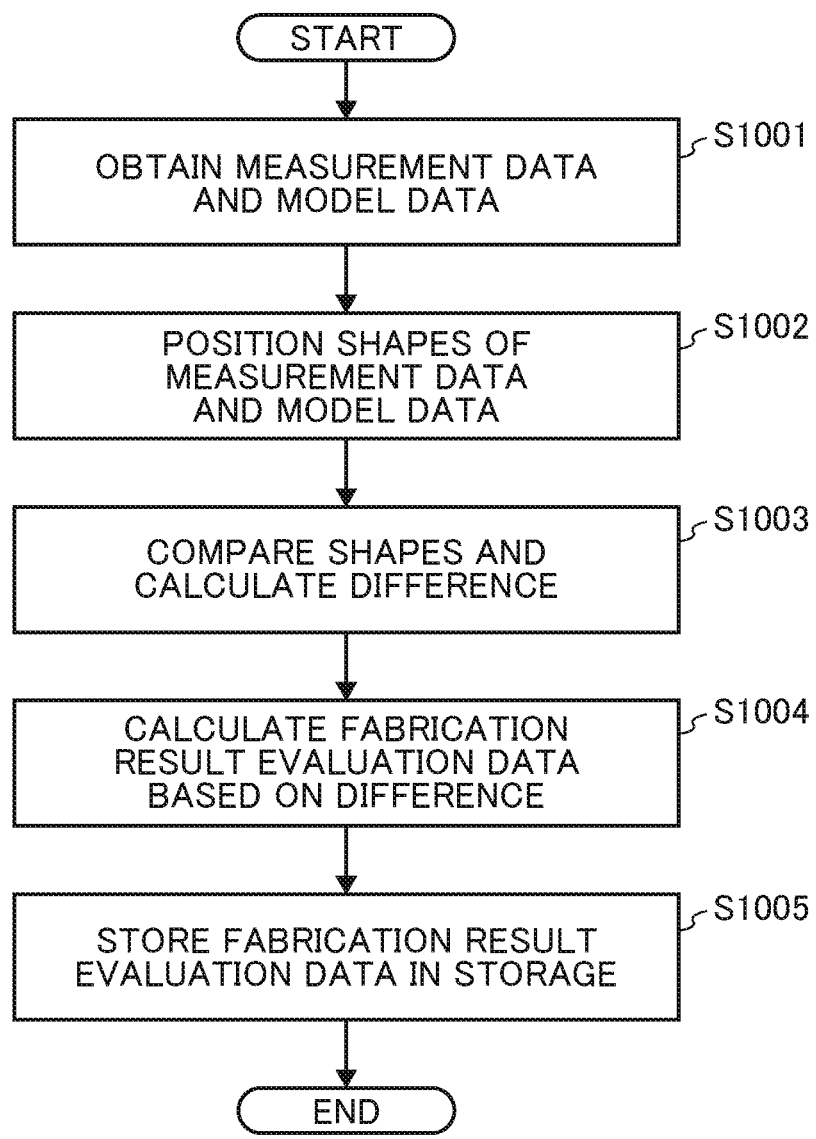
FIG. 6 is a flowchart of processing for evaluating the shape of the three-dimensional object fabricated in the present embodiment.

Next, processing executed by the shape evaluation unit 322 will be described in detail. FIG. 6 is a flowchart of processing for evaluating the shape of the three-dimensional object fabricated in the present embodiment.

The shape evaluation unit 322 starts processing. In step S1001, the shape evaluation unit 322 obtains the input model data and the measurement data obtained by measuring the shape of the three-dimensional object fabricated according to the model data.

In step S1002, the shape evaluation unit 322 performs positioning of the shapes of the measurement data and the model data. The positioning processing can be executed, for example, by matching a surface shape of the model data with a surface shape of the three-dimensional object which has been measured. The method of the positioning processing is not limited to the above, and the positioning processing may be executed by a method other than the surface shape matching. For example, it is possible that a certain coordinate in the model data is set as an origin and a coordinate of the corresponding three-dimensional object is adjusted to match the position of the set coordinate.

In step S1003, the shape evaluation unit 322 compares the measurement data with the model data and calculates the difference between the shapes of the measurement data and the model data. In step S1004, the shape evaluation unit 322 calculates the fabrication result evaluation data in which the calculated difference, the model data, and the setting data of the fabrication condition are associated with each other.

The fabrication result evaluation data is stored in the storage unit 323 in step S1005. Then, the processing ends.

Figure 7:
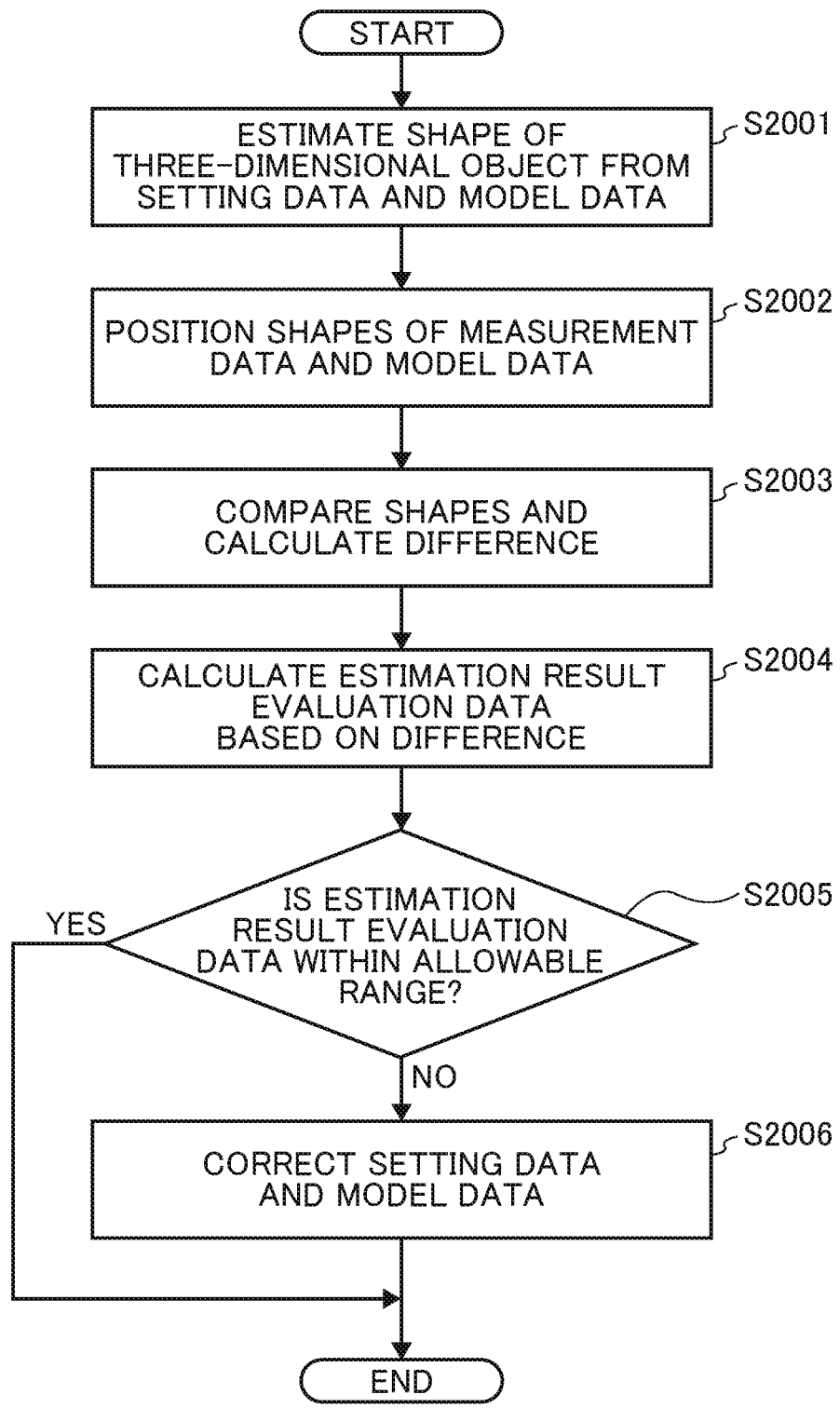
FIG. 7 is a flowchart of correction processing based on an estimation result according to the present embodiment.

Next, processing executed by the correction unit 330 will be described in detail. FIG. 7 is a flowchart of correction processing according to the estimation result according to the present embodiment.

The correction unit 330 starts processing. In step S2001, the fabrication estimation unit 324 estimates the shape of the three-dimensional object from the setting data of the fabrication condition and the model data to be estimated. The shape can be estimated by using various simulation methods.

The estimation evaluation unit 327 obtains the estimation data of the shape of the three-dimensional object and the model data and performs positioning processing of the estimated shape of the three-dimensional object and the shape of the model data in step S2002. The positioning can be performed by the method similar to the method in step S1002.

In step S2003, the estimation evaluation unit 327 compares the estimation result with the shape of the model data and calculates a difference between the estimation result and the shape of the model data. In step S2004, the estimation evaluation unit 327 calculates the estimation result evaluation data based on the calculated difference. The estimation result evaluation data includes, for example, not only the difference in dimensions but also differences such as the warpage, the volume, a local shape of the three-dimensional object, and the like.

In step S2005, the estimation evaluation unit 327 determines whether the estimation result evaluation data falls within an allowable range. For example, even when there is a difference between the estimated shape of the three-dimensional object and the shape of the model data, if the difference is allowable, it is assumed that the fabrication be successfully made. Therefore, the fabrication condition used for estimation and the model data can be used for the fabrication processing without being corrected.

On the other hand, if the difference between the shapes does not fall within the allowable range, it is assumed that the fabrication fails, and the model data and the setting data of the fabrication condition are corrected. Parameters other than the shape are similarly evaluated, and the success/failure of the fabrication can be determined.

In step S2005, in a case where the estimation result evaluation data falls within the allowable range (YES), the processing ends. On the other hand, in a case where the estimation result evaluation data does not fall within the allowable range (NO) in step S2005, the procedure proceeds to step S2006.

In step S2006, the data correction unit 329 corrects the setting data of the fabrication condition and the model data. The data correction unit 329 can make correction based on the fabrication result evaluation data of the three-dimensional objects fabricated in the past, accumulated in the storage unit 323. After the data has been corrected, the processing ends.

After the data has been corrected in step S2006, it is possible that the procedure returns to step S2001 and processing for making estimation again according to the corrected data and making evaluation is repeated. The repeated processing may be repeated by a predetermined number of times as the upper limit and may be repeated until it is determined that the estimation result evaluation data falls within the allowable range in step S2005. By repeating the estimation and the data correction in this way, an accuracy of the fabrication of the three-dimensional object can be improved.

Figure 8A:
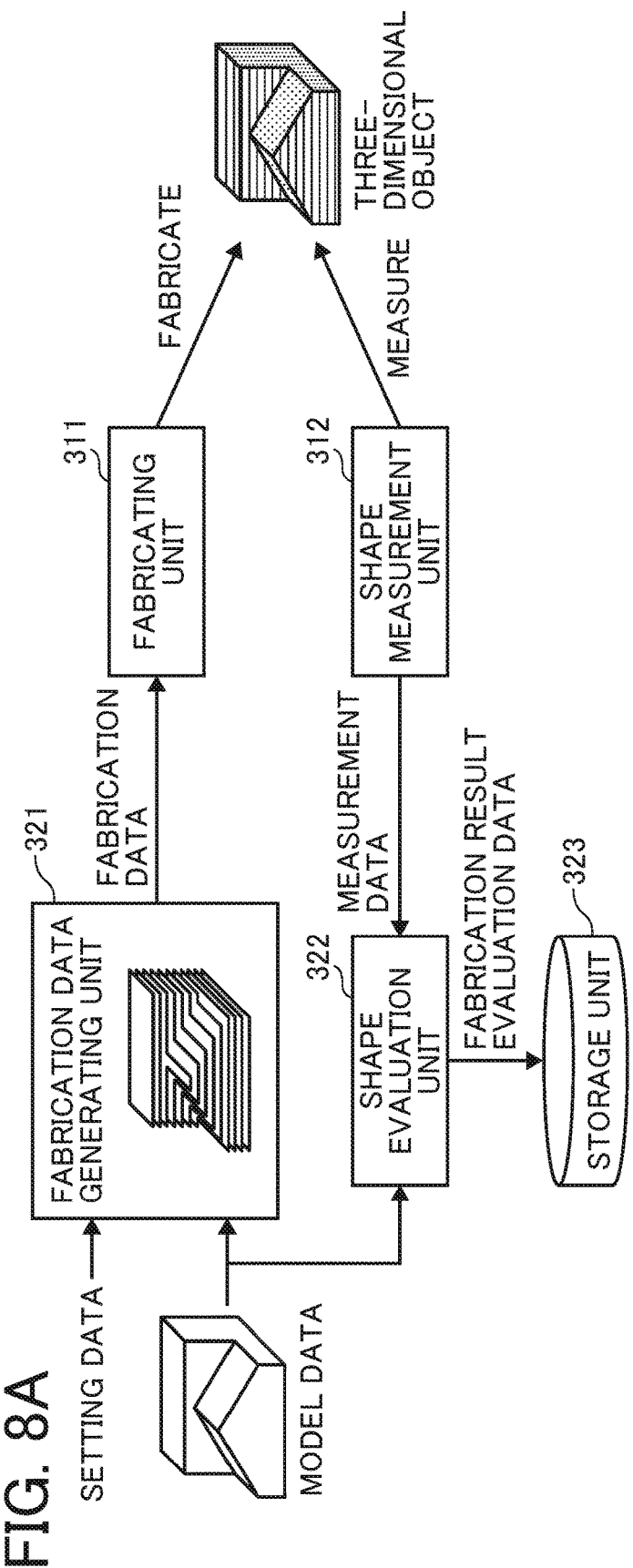
FIGS. 8A and 8B are diagrams of data flows of processing according to another embodiment.
Figure 8B:
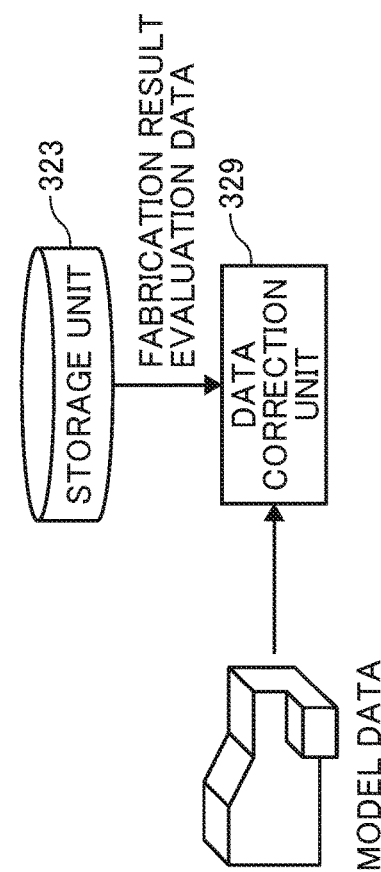

The embodiment has been described in which the data is corrected according to the shape data estimated based on the model data and the setting data and the accumulated fabrication result evaluation data. However, the embodiment of the present disclosure is not limited to the above and may be another embodiment. For example, in another preferred embodiment, the data correction unit 329 can correct the model data and the setting data without depending on the estimation result evaluation data. FIGS. 8A and 8B are diagrams of data flows of processing according to the other embodiment.

FIG. 8A is a data flow of processing for evaluating the shape of the three-dimensional object as in FIG. 4A. As illustrated in FIG. 8A, the shape evaluation unit 322 evaluates the shape of the three-dimensional object each time when the three-dimensional object is fabricated so that the fabrication result according to various fabrication conditions and the model data can be accumulated in the storage unit 323 and the correction accuracy can be improved.

FIG. 8B is a data flow for correcting model data and setting data in the other embodiment. A data correction unit 329 obtains model data of a three-dimensional object to be fabricated. The data correction unit 329 refers to fabrication result evaluation data of the three-dimensional objects fabricated in the past accumulated in a storage unit 323 and corrects the model data and the setting data according to the obtained model data so that the three-dimensional object to be fabricated has a desired shape.

For example, a case is considered where the storage unit 323 stores fabrication result evaluation data indicating that a three-dimensional object having a shape similar to the model data is fabricated to be compact. In this case, the data correction unit 329 corrects the model data and the setting data according to the fabrication result evaluation data so that the three-dimensional object is fabricated to be large.

In some embodiments, when the fabrication of the three-dimensional object having a shape similar to the model data was successful in the past, the data correction unit 329 may correct the fabrication conditions set by the user into the conditions having been set in the successful fabrication. For example, a case is considered where the storage unit 323 stores fabrication result evaluation data indicating that a three-dimensional object having a shape similar to the model data was accurately fabricated. In such a case, the data correcting unit 329 refers to the modeling result evaluation data and quotes the setting data to correct the fabrication conditions of the three-dimensional object.

Although a fabricating apparatus 111 does not include a shape measurement unit 312, as described referring to FIGS. 4A and 4B, the fabricating apparatus 111 may correct the data according to fabrication result evaluation data of a shape evaluation unit 322 of the other fabricating apparatus 110 including the shape measurement unit 312.

Figure 9:
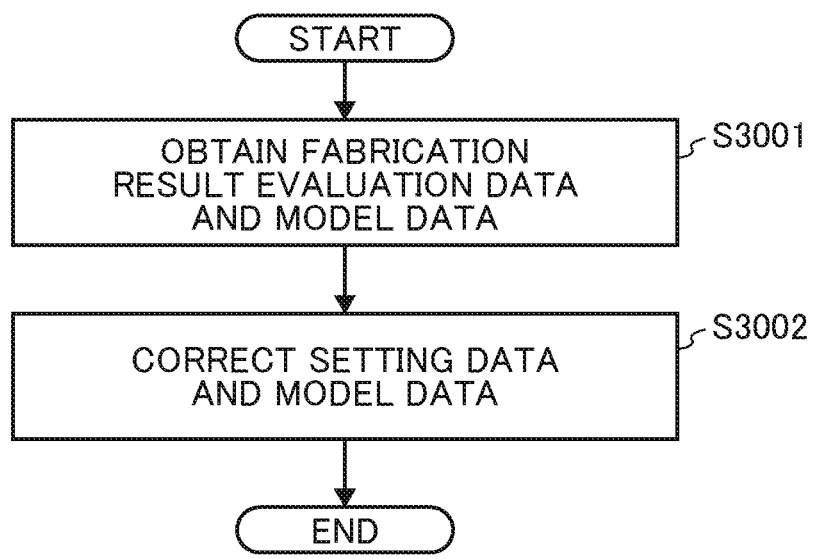
FIG. 9 is a flowchart of correction processing based on fabrication result evaluation data according to the other embodiment.

FIG. 9 is a flowchart of correction processing based on the fabrication result evaluation data according to the other embodiment. The correction unit 330 starts processing.

In step S3001, the data correction unit 329 obtains fabrication target model data. Furthermore, in step S3001, the data correction unit 329 obtains the fabrication result evaluation data referring to the storage unit 323.

In step S3002, the data correction unit 329 corrects the model data and the setting data of the fabrication condition according to the model data and the fabrication result evaluation data. After the data has been corrected, the correction unit 330 ends the processing.

Since the shape is not estimated in the processing illustrated in FIG. 9, a time required for data correction can be shortened, and the data can be efficiently corrected. The correction unit 330 can appropriately switch the data correction processing based on the estimated shape data (processing illustrated in FIG. 4B) and the data correction processing without depending on the estimated shape data (processing illustrated in FIG. 8B). A timing of switching the processing is not particularly limited, and the processing can be switched at an arbitrary timing. For example, the processing may be periodically switched in a predetermined time and may be switched according to a remaining amount of a fabrication material. Furthermore, a configuration may be used in which a user arbitrarily switches the processing.

Figure 10:
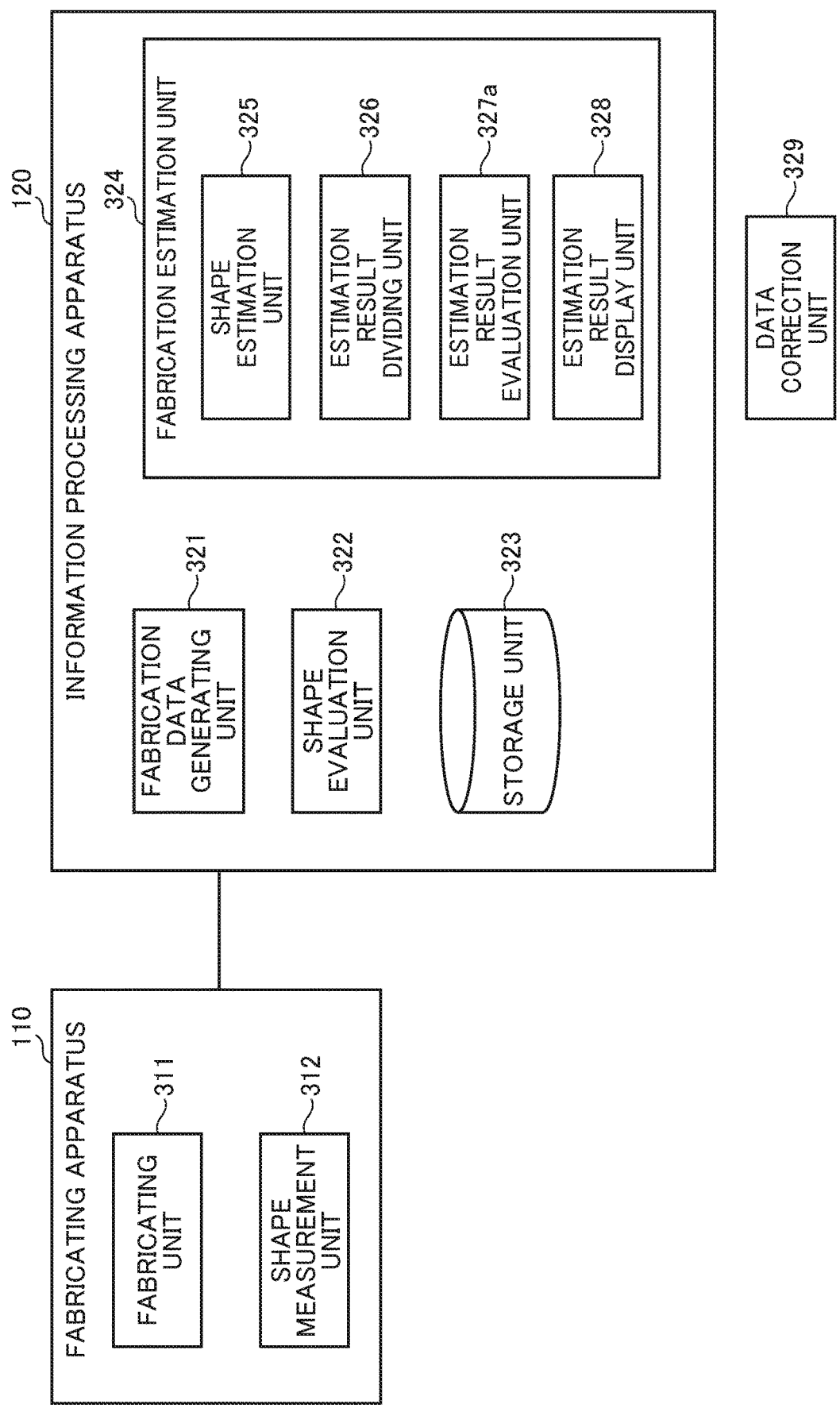
FIG. 10 is a block diagram of software included in the information processing apparatus according to a second embodiment of the present disclosure.

Next, functional units executed by each of the hardware included in the fabrication system 100 according to a second embodiment will be described referring to FIG. 10. FIG. 10 is a block diagram of software included in the fabrication system 100 according to the second embodiment. Descriptions of the functional units common to the first embodiment are appropriately omitted.

In the second embodiment, the fabricating apparatus 110 includes the fabricating unit 311 and the shape measurement unit 312. The information processing apparatus 120 includes the fabrication data generating unit 321, the shape evaluation unit 322, the storage unit 323, the fabrication estimation unit 324, and the data correction unit 329.

Next, the information processing apparatus 120 will be described.

The fabrication estimation unit 324 estimates the shape of the three-dimensional object to be fabricated before the fabrication is performed and perform correction. The fabrication estimation unit 324 includes a shape estimation unit 325, an estimation result dividing unit 326, an estimation result evaluation unit 327a, and an estimation result display unit 328.

The shape estimation unit 325 estimates the shape of the three-dimensional object to be fabricated in a case of fabricating the model data under the set fabrication condition. The estimation result of the shape estimation unit 325 is output as estimation data. The shape estimation unit 325 may estimate the shape of the three-dimensional object according to the fabrication data obtained from the fabrication data generating unit 321.

The estimation result dividing unit 326 divides the estimation result (three-dimensional shape) of the model data to which the additional model data is added.

The estimation result evaluation unit 327a compares the estimation data with the model data and evaluating whether the fabrication succeeds from a difference between the shapes of both data. In a case where the difference between the shapes of the estimation data and the model data is smaller than a threshold, the estimation result evaluation unit 327a determines that the fabrication has succeeded. Furthermore, in a case where the difference between the shapes of the estimation data and the model data is equal to or larger than the threshold, the estimation result evaluation unit 327a determines that the fabrication fails.

The estimation result display unit 328 graphically displays the results estimated by the shape estimation unit 325.

In a case where the estimation result evaluation unit 327a has determined that the fabrication fails, the data correction unit 329 corrects the model data, the fabrication condition, and the like so that the fabrication processing succeeds. The data correction unit 329 corrects the model data, the fabrication condition, and the like according to the fabrication result evaluation accumulated in the storage unit 323.

The shape estimation unit 325 may estimate the shape of the three-dimensional object to be fabricated again according to the corrected model data and fabrication condition.

The software blocks described above correspond to functional units implemented by the CPUs 211 and 221 executing programs of the second embodiment to function respective hardware. All the functional units indicated in the second embodiment may be implemented as software, and a part or all of the functional units can be implemented as hardware providing equivalent functions. It is not necessarily for each functional unit described above to be included in the configuration illustrated in FIG. 10. In another preferred embodiment, each functional unit may be implemented by the fabricating apparatus 110 and the information processing apparatus 120 in cooperation with each other.

Figure 11:
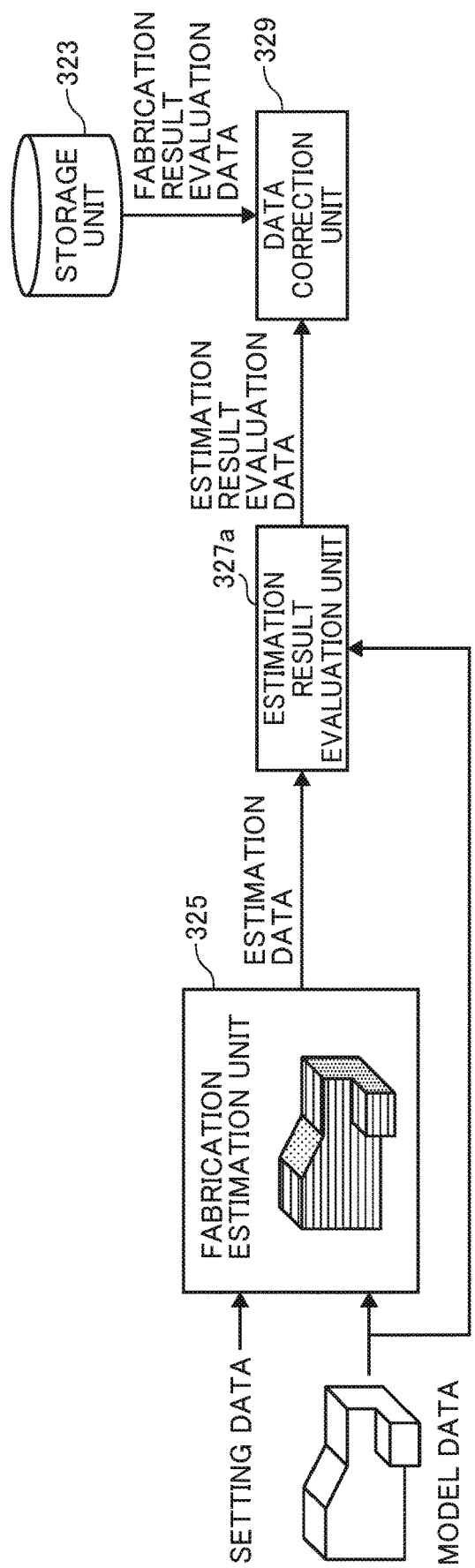
FIG. 11 is a diagram of a data flow of processing according to another embodiment.

Next, a data flow of the second embodiment will be described. The data flow of the processing for evaluating the shape of a three-dimensional object in the second embodiment is the same as in the first embodiment. Therefore, descriptions of the data flow is omitted. FIG. 11 is a data flow of correction processing based on the estimation result.

In FIG. 11, the shape estimation unit 325 estimates the shape of the three-dimensional object which is fabricated in a case where the input model data is fabricated according to the setting data. The estimation result evaluation unit 327a compares the estimation data with the model data to evaluate the estimated shape of the three-dimensional object. In the estimation, for example, the estimation result evaluation unit 327 calculates the difference between the shapes of the estimation data and the model data and evaluates whether the fabrication succeed according to whether the difference is larger than the threshold.

The data correction unit 329 corrects the model data and the setting data so as to reduce the difference between the shapes of the estimation data and the model data according to estimation result evaluation data. Data may be corrected referring to the fabrication result evaluation data of the three-dimensional objects fabricated in the past accumulated in the storage unit 323, and this can improve the correction accuracy.

Here, data correction based on the fabrication result and the estimation result will be described. As in the first embodiment, for example, it is assumed that the three-dimensional object fabricated in a case where fabrication target model data having a rectangular parallelepiped shape as illustrated in FIG. 5A is fabricated under a condition A be larger than the model data.

The shape evaluation unit 322 obtains a difference between the shape of the three-dimensional object and the shape of the model data and evaluates the fabrication result. Here, the difference may be evaluated as including not only the dimensions of the shape but also occurrence of warpage, a volume, and the like. Furthermore, in a case where the three-dimensional object has a characteristic shape, a local difference of the characteristic portion may be obtained. Then, the fabrication result evaluation data in which the difference, the model data, and the fabrication condition are associated with each other is calculated and is stored in the storage unit 323.

As in the first embodiment, on the other hand, a case is considered where the shape of the three-dimensional object in a case where estimation target model data as in FIG. 5B is fabricated under a condition B is estimated. At this time, it is assumed that a portion having a rectangular parallelepiped shape of the estimated three-dimensional object in a region indicated by a broken line be smaller than the model data.

When the estimation result evaluation unit 327a calculates the difference between the shape of the estimation target model data in FIG. 5B and the estimated shape of the three-dimensional object, the portion having a rectangular parallelepiped shape in the region indicated by the broken line is extracted as the difference. In a case where this difference is larger than the threshold, if the model data to be estimated is fabricated under the condition B, there is high possibility that the fabrication fails. Therefore, the data correction unit 329 corrects data.

The data correction unit 329 corrects the shape of the model data to reduce the difference. Since the portion having a rectangular parallelepiped shape becomes smaller in the estimation, the data correction unit 329 corrects the model data to increase the dimension of the portion having a rectangular parallelepiped shape to fabricate a three-dimensional object having a shape close to the original estimation target model data.

Furthermore, the data correction unit 329 may refer to the fabrication result evaluation data stored in the storage unit 323. For example, as described referring to FIG. 5A, the storage unit 323 stores information such that the dimension of the three-dimensional object fabricated in a case where the model data having a rectangular parallelepiped shape is fabricated under the condition A is larger than the model data. Therefore, the data correction unit 329 determines that the portion having a rectangular parallelepiped shape is fabricated to be larger when fabricating an object under the condition A, and corrects the setting data of the fabrication condition from B to A. With this correction, a three-dimensional object having a shape close to the original estimation target model data can be fabricated at the time of actual fabrication.

Figure 12:
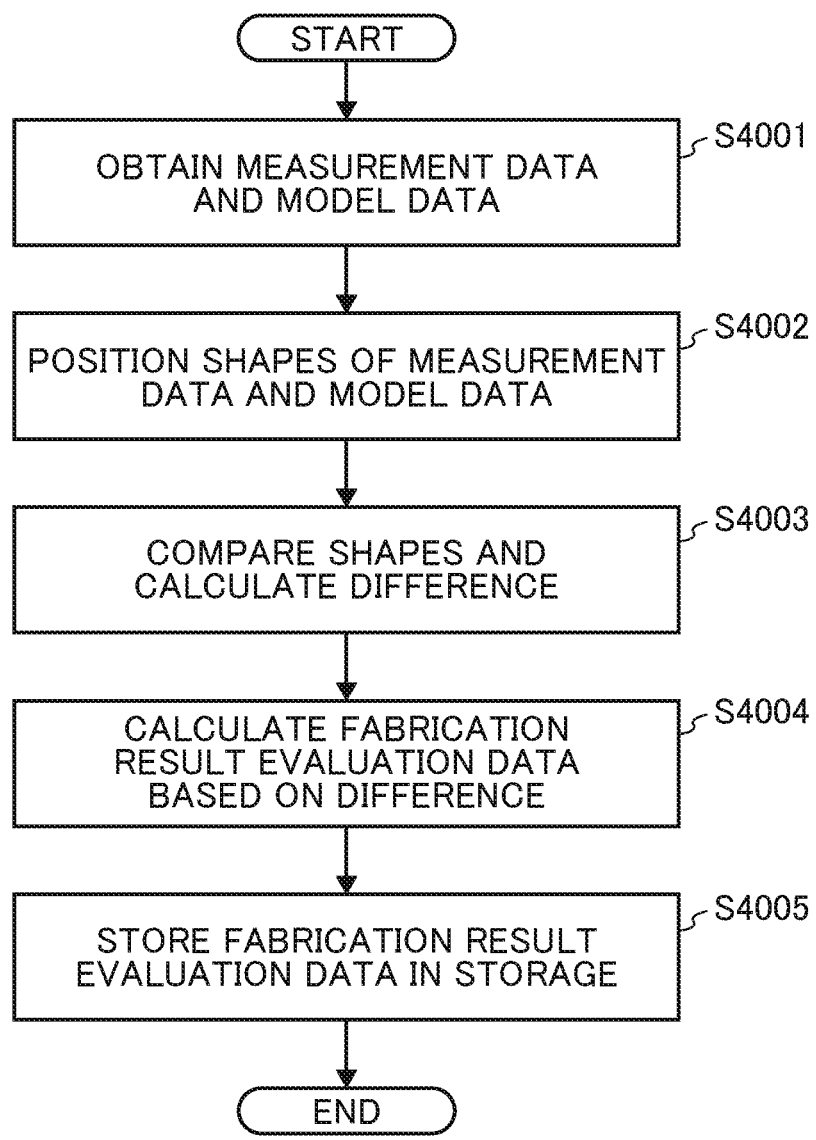
FIG. 12 is a flowchart of processing for evaluating the shape of the three-dimensional object fabricated in the second embodiment.

Next, processing executed by the shape evaluation unit 322 will be described in detail. FIG. 12 is a flowchart of processing for evaluating the shape of the three-dimensional object fabricated in the second embodiment.

The shape evaluation unit 322 starts processing. In step S4001, the shape evaluation unit 322 obtains the input model data and the measurement data obtained by measuring the shape of the three-dimensional object fabricated according to the model data.

In step S4002, the shape evaluation unit 322 performs positioning of the shapes of the measurement data and the model data. The positioning processing can be executed, for example, by matching a surface shape of the model data with a surface shape of the three-dimensional object which has been measured. The method of the positioning processing is not limited to the above, and the positioning processing may be executed by a method other than the surface shape matching. For example, it is possible that a certain coordinate in the model data is set as an origin and a coordinate of the corresponding three-dimensional object is adjusted to match the position of the set coordinate.

In step S4003, the shape evaluation unit 322 compares the measurement data with the model data and calculates the difference between the shapes of the measurement data and the model data. In step S4004, the shape evaluation unit 322 calculates the fabrication result evaluation data in which the calculated difference, the model data, and the setting data of the fabrication condition are associated with each other.

The fabrication result evaluation data is stored in the storage unit 323 in step S4005. Then, the processing ends.

Figure 13:
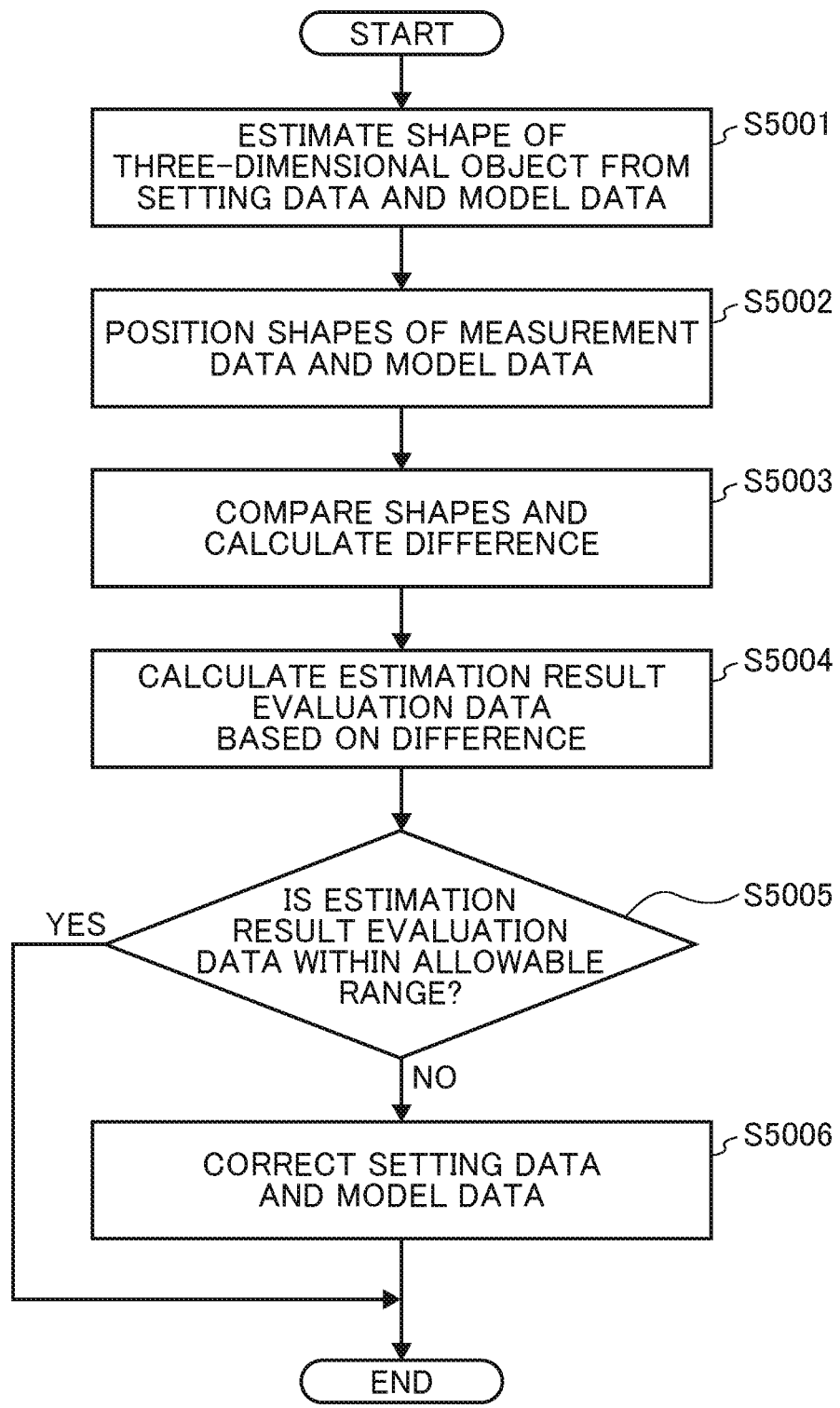
FIG. 13 is a flowchart of correction processing based on an estimation result according to the second embodiment.

Next, processing executed by the fabrication estimation unit 324 and the data correction unit 329 will be described in detail. FIG. 13 is a flowchart illustrating correcting processing based on the estimation result in the second embodiment.

The shape estimation unit 324 starts processing. In step S5001, the shape estimation unit 325 estimates the shape of the three-dimensional object from the setting data of the fabrication condition and the model data to be estimated. The shape can be estimated by using various simulation methods.

The estimation result evaluation unit 327a obtains the estimation data of the shape of the three-dimensional object and the model data and performs positioning processing of the estimated shape of the three-dimensional object and the shape of the model data in step S5002. The positioning can be performed by the method similar to the method in step S4002.

In step S5003, the estimation result evaluation unit 327a compares the estimation result with the shape of the model data and calculates a difference between the estimation result and the shape of the model data. In step S5004, the estimation result evaluation unit 327a calculates the estimation result evaluation data according to the calculated difference. The estimation result evaluation data includes, for example, not only the difference in dimensions but also differences such as the warpage, the volume, a local shape of the three-dimensional object, and the like.

In step S5005, the estimation result evaluation unit 327a determines whether the estimation result evaluation data falls within an allowable range. For example, even when there is a difference between the estimated shape of the three-dimensional object and the shape of the model data, if the difference is allowable, it is assumed that the fabrication be successfully made. Therefore, the fabrication condition used for estimation and the model data can be used for the fabrication processing without being corrected.

On the other hand, if the difference between the shapes does not fall within the allowable range, it is assumed that the fabrication fails, and the model data and the setting data of the fabrication condition are corrected. Parameters other than the shape are similarly evaluated, and the success/failure of the fabrication can be determined.

In step S5005, in a case where the estimation result evaluation data falls within the allowable range (YES), the processing ends. On the other hand, in a case where the estimation result evaluation data does not fall within the allowable range (NO) in step S5005, the procedure proceeds to step S5006.

In step S5006, the data correction unit 329 corrects the setting data of the fabrication condition and the model data. The data correction unit 329 can make correction according to the fabrication result evaluation data of the three-dimensional objects fabricated in the past, accumulated in the storage unit 323. After the data has been corrected, the processing ends.

After the data has been corrected in step S5006, it is possible that the procedure returns to step S5001 and processing for making estimation again according to the corrected data and making evaluation is repeated. The repeated processing may be repeated by a predetermined number of times as the upper limit and may be repeated until it is determined that the estimation result evaluation data falls within the allowable range in step S5005. By repeating the estimation and the data correction in this way, an accuracy of the fabrication of the three-dimensional object can be improved.

The processing executed by the shape estimation unit 324 and the data correction unit 329 has been described above. Here, a description is given of the shape evaluation in the case of adding the additional model data for keeping the fabrication quality to the model data to form a three-dimensional model.

Figure 14A:
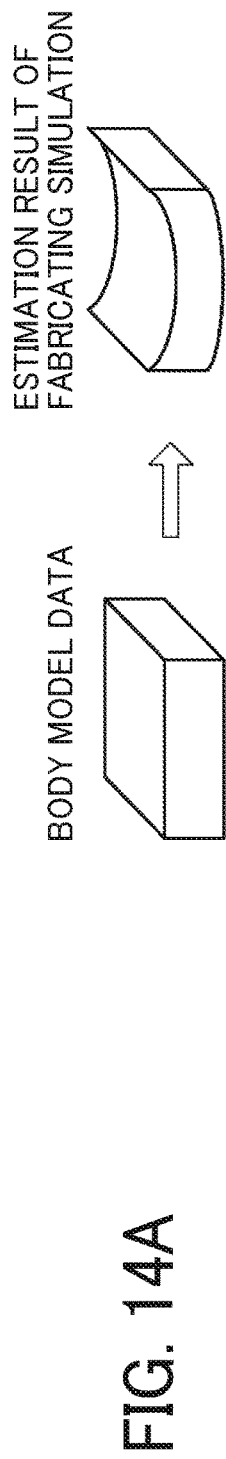
FIGS. 14A and 14B are conceptual diagrams for explaining shape evaluation when an additional model is added.

In general, when fabrication is performed using a material with a large thermal shrinkage rate, deformation (warping, distortion, twisting) may occur in a three-dimensional object due to shrinkage caused by a temperature decrease. In this regard, the estimation result evaluation unit 327*a* estimates the deformation that would occur in the three-dimensional object, for example, as illustrated in FIG. 14A.

On the other hand, to prevent such deformation occurring in a three-dimensional object, it is widely practiced to add additional model data such as brim or raft to three-dimensional model data (hereinafter referred to as body model data) of a three-dimensional object to be shaped (hereinafter may be referred to as body) to be fabricated, to increase the bottom area of the three-dimensional object.

Here, brim means a layer structure of one or more layers in which the area of the first layer of the body model data is enlarged. Raft means a meshed layer structure of one or more layers arranged under the body model data.

Figure 14B:
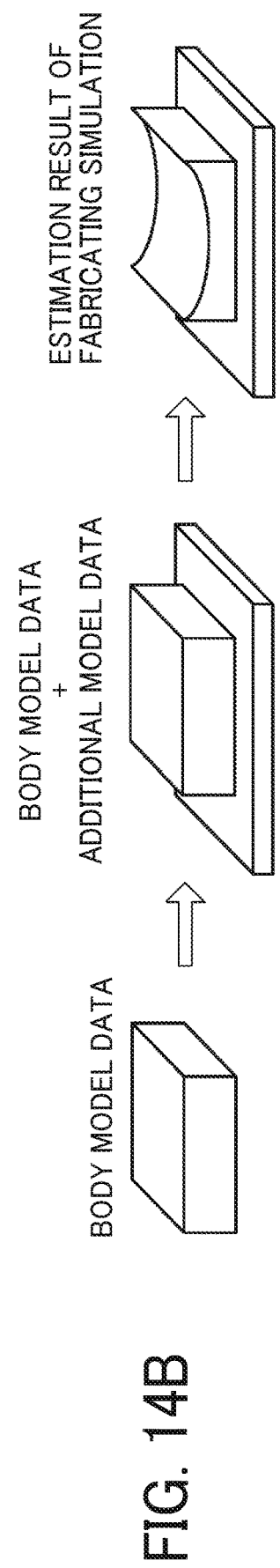

When the additional model data is added to the body model data, the estimation result evaluation unit 327*a* estimates the fabrication result, for example, as illustrated in FIG. 14B. Since the estimation result in such a case includes the structure corresponding to the additional model data, in this state, how much the body to be fabricated has been deformed (that is, how much deformation has been reduced by adding the additional model data) cannot be evaluated.

Figure 15:
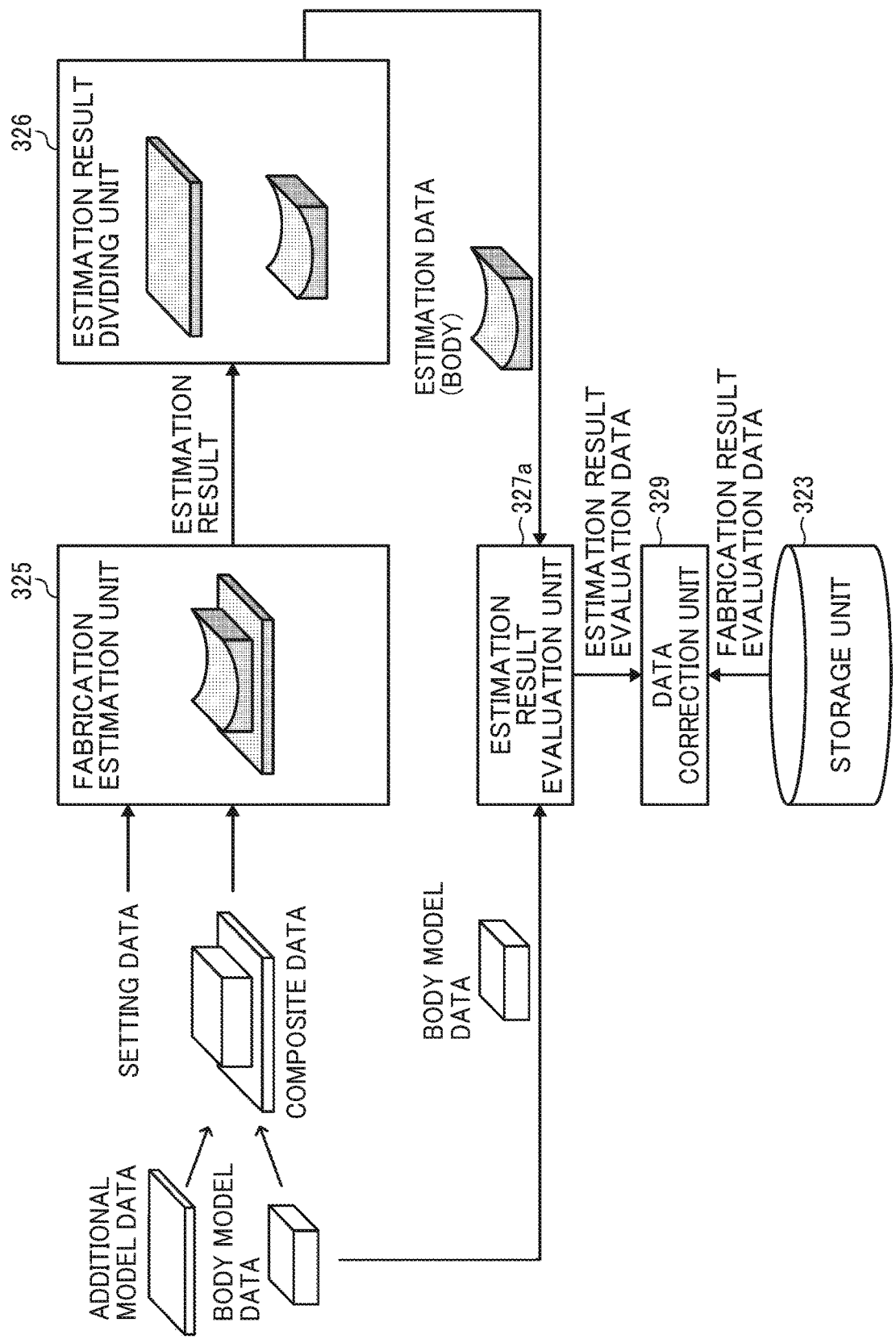
FIG. 15 is a diagram of a data flow of processing according to the second embodiment.

How such a problem is solved in the second embodiment will be described based on the data flow illustrated in FIG. 15.

First, three-dimensional model data (hereinafter referred to as composite data) obtained by combining body model data and additional model data and setting data of the composite data are input to the shape estimation unit 325. In response to the input, the shape estimation unit 325 estimates the three-dimensional shape of the three-dimensional object that is fabricated in a case where the input model data is fabricated according to the setting data. For example, the shape estimation unit 325 divides the three-dimensional shape of the composite data by a fine mesh, calculates how the coordinates of the mesh are displaced by the fabrication, and outputs the estimation result to the estimation result dividing unit 326.

Figure 16A:
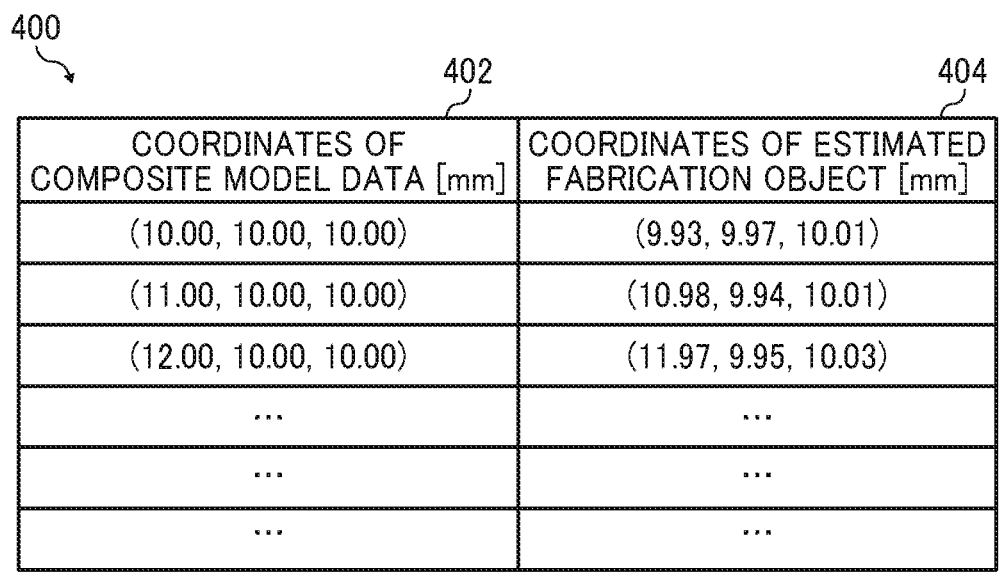
FIG. 16A is a diagram of a coordinate association table.

Here, the estimation result output by the shape estimation unit 325 to the estimation result dividing unit 326 includes a coordinate association table in which three-dimensional coordinates of each vertex of the mesh dividing the composite data are associated with three-dimensional coordinates corresponding to each vertex in an estimated fabrication object. FIG. 16A illustrates a coordinate association table 400 as an example of the coordinate association table.

In response to the estimation result input from the shape estimation unit 325, the estimation result dividing unit 326 divides the input estimation result (three-dimensional shape of the estimated fabrication object) into a first partial shape corresponding to body model data and a second partial shape corresponding to additional model data.

Figure 16B:
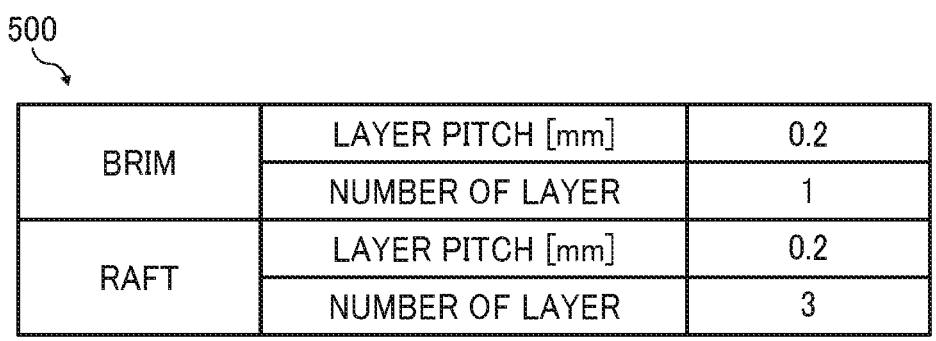
FIG. 16B is a diagram of additional model information.

If the additional model data is brim or raft, the estimation result dividing unit 326 divides the estimation result according to the following manner, based on the coordinate association table 400 received from the shape estimation unit 325 and additional model information 500 illustrated in FIG. 16B.

In dividing the estimation result, first, the estimation result dividing unit 326 derives the size of the additional model, based on the layer pitches and the number of layer of the brim and the raft included in the additional model information 500.

Next, the estimation result dividing unit 326 collates the mesh coordinates of the composite model data stored in a field 402 of the coordinate association table 400 with the size of the derived additional model and identifies a mesh coordinate group a constituting the additional model data from among mesh coordinate groups A stored in the field 402.

Next, the estimation result dividing unit 326 identifies a coordinate group a' of the estimated fabrication object corresponding to the identified coordinate group a, from among coordinate groups A' of the estimated fabrication object stored in the field 404.

Finally, the estimation result dividing unit 326 obtains the identified coordinate group a' as the second partial shape corresponding to the additional model data, and obtains a coordinate group b' that remains after removing the identified coordinate group a' from the coordinate group A' of the estimated fabrication object, as the first partial shape corresponding to the body model data.

The estimation result dividing unit 326 outputs the first partial shape (three-dimensional shape) obtained by the above-described procedure as the estimation data to the estimation result evaluation unit 327*a*.

In response to the estimation data, the estimation result evaluation unit 327*a* compares the input prediction data with the body model data to perform evaluation. For example, the estimation result evaluation unit 327*a* obtains the dimension of the first partial shape and determines whether the difference between the dimension of the obtained first partial shape and the dimension of the body model data is equal to or less than the tolerance. Note that the dimension referred to herein includes, for example, the dimension of a bounding box surrounding the first partial shape.

In response to a request from the user, the estimation result display unit 328 graphically displays at least one of the shape of the body model data, the first partial shape corresponding to the body model data, and the second partial shape corresponding to the additional model data.

As described above, the second embodiment can evaluate how much the deformation of a three-dimensional object is reduced by adding additional model data for maintaining fabrication qualities to body model data.

According to the above-described embodiments of the present disclosure, a fabrication system, an information processing apparatus, a fabricating apparatus, a fabricating method, and carrier medium (means) or recording medium storing program code to estimate the shape of a three-dimensional object to be fabricated and correcting the shape of the three-dimensional object.

Each function of the above-described embodiments of the present disclosure can be implemented by a program which can be executed by a device and is written in C, C++, C#, Java (registered trademark), or the like. The program according to the present embodiment can be stored in a device-readable recording medium such as a hard disk device, a CD-ROM, a magnetooptic disc (MO), a digital versatile disc (DVD), a flexible disk, an electronically erasable and programmable read only memory (EEPROM), and an erasable programmable read-only memory (EPROM)

and distributed, and can be transmitted via a network in a format which can be read by other devices.

The embodiments of the present disclosure have been described above. However, embodiments of the present disclosure are not limited to the above embodiments, and an embodiment which can obtain the act and the effect of the present invention within the scope of the embodiments that a person skilled in the art could easily arrive at is included in the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing apparatus configured to control a fabricating apparatus that fabricates a three-dimensional object, the information processing apparatus comprising:
processing circuitry configured to:
estimate; according to a fabrication condition and fabrication data obtained from model data, dimensions and a warpage of the three-dimensional object to be fabricated according to the fabrication data;
correct at least the model data according to an estimation result of the three-dimensional object estimated by the processing circuitry to increase a dimension of the model data when the three-dimensional object is estimated to be smaller than the model data;
re-estimate the three-dimensional object after the correction; and
proceed with fabrication of the three-dimensional object with the corrected model data.

2. A fabrication system, comprising:
the information processing apparatus according to claim 1;
the fabricating device apparatus configured to fabricate the three-dimensional object according to the fabrication data;
a sensor to measure a shape of the three-dimensional object fabricated by the fabricating apparatus; and
a memory to store a measurement result of the shape of the three-dimensional object measured by the sensor, in association with the fabrication data,
wherein the processing circuitry corrects the fabrication data according to the measurement result.

3. The fabrication system according to claim 2, further comprising:
another fabricating device to fabricate the three-dimensional object according to the fabrication data corrected by the processing circuitry.

4. The information processing apparatus according to claim 1,
wherein the processing circuitry is configured to generate the fabrication data by converting the model data to a format processable by the fabrication apparatus.

5. The information processing apparatus according to claim 1,
wherein the processing circuitry is configured to increase the dimension of the model data to reduce a difference between an estimated shape of the three-dimensional object estimated by the processing circuitry and a shape of the model data.

6. A fabrication system comprising:
the information processing apparatus according to claim 1;
the fabricating apparatus configured to fabricate the three-dimensional object according to the fabrication data;
a sensor to measure a shape of the three-dimensional object fabricated by the fabricating apparatus; and
a memory to store a measurement result of the shape of the three-dimensional object measured by the sensor, in association with the fabrication data.

7. The fabrication system according to claim 6, wherein the processing circuitry is configured to perform a correction process to correct the model data and the fabrication condition according to the measurement result.

8. The fabrication system according to claim 7, further comprising:
another processing circuitry to estimate, according to the fabrication condition and the fabrication data, the three-dimensional object to be fabricated according to the fabrication data,
wherein the processing circuitry performs another correction process to correct the model data according to an estimation result of the three-dimensional object estimated by said another processing circuitry.

9. The fabrication system according to claim 8,
wherein the processing circuitry switches the correction process and said another correction process.

10. A fabrication system, comprising:
a fabricating apparatus configured to fabricate a three-dimensional object according to fabrication data obtained from model data; and
an information processing apparatus configured to control the fabricating apparatus, the information processing apparatus including processing circuitry configured to:
estimate, according to a fabrication condition and the fabrication data, dimensions and a warpage of the three-dimensional object to be fabricated according to the fabrication data;
correct at least the model data according to an estimation result of the three-dimensional object estimated by the processing circuitry to increase a dimension of the model data when the three-dimensional object is estimated to be smaller than the model data;
re-estimate the three-dimensional object after the correction; and
proceed with fabrication of the three-dimensional object with the corrected model data.

11. The information processing apparatus of claim 1, wherein the processing circuitry is configured to estimate a shape of the three-dimensional object before fabrication of same to generate estimation data, and to selectively correct the model data based on the estimation data by increasing a dimension of a portion of the three-dimensional object having a rectangular parallelepiped shape.

12. The information processing apparatus of claim 11, wherein the processing circuitry is configured to estimate one or more of a warpage of the shape and an external dimension of the shape to generate the estimation data.

13. The information processing apparatus of claim 11, wherein the processing circuitry is configured to correct the model data when a difference between the estimation data and the model data is greater than or equal to a threshold.

14. The information processing apparatus of claim 13, wherein the processing circuitry is configured to determine to proceed with fabrication of the three-dimensional object, when the difference between the estimation data and the model data is less than the threshold.

15. The information processing apparatus of claim 13, wherein, after correcting the model data, the processing circuitry is configured to re-estimate the shape of the three-dimensional object before fabrication of same to update the estimation data.

\* \* \* \* \*